United States Patent [19]

Suga et al.

[11] Patent Number: 5,286,540
[45] Date of Patent: Feb. 15, 1994

[54] BLOW MOLDED CONTAINER MADE OF POLYPROPYLENE RESIN

[75] Inventors: Yoshinori Suga, Machida; Eiji Tanaka, Kawasaki; Tsunemi Yoshioka, Kurashiki; Masaaki Uchida, Kurashiki; Hidehito Kato, Kurashiki; Masayuki Arai, Kurashiki, all of Japan

[73] Assignee: Mitsubishi Kasei Corporation, Tokyo, Japan

[21] Appl. No.: 34,216

[22] Filed: Mar. 19, 1993

Related U.S. Application Data

[63] Continuation of Ser. No. 613,697, Dec. 13, 1990, abandoned.

[30] Foreign Application Priority Data

| Mar. 29, 1989 [JP] | Japan | 1-77695 |
| Mar. 30, 1989 [JP] | Japan | 1-79174 |
| Jan. 11, 1990 [JP] | Japan | 2-4220 |
| Jan. 11, 1990 [JP] | Japan | 2-4221 |

[51] Int. Cl.$^5$ ............ C08L 23/10; C08L 23/20; B65D 1/26
[52] U.S. Cl. ............ 428/36.92; 428/35.7; 525/240; 525/323; 525/95
[58] Field of Search ............ 428/36.92, 35.7; 525/240, 247, 323, 95, 270

[56] References Cited

U.S. PATENT DOCUMENTS

| 4,603,194 | 7/1986 | Okada | 525/240 |
| 4,696,979 | 9/1987 | Shiga | 525/247 |
| 4,824,704 | 4/1989 | Suga | 428/36.92 |

FOREIGN PATENT DOCUMENTS

| 0251340 | 1/1988 | European Pat. Off. |
| 0369213 | 5/1990 | European Pat. Off. |
| 53-98353 | 8/1978 | Japan. |
| 1030797 | 5/1966 | United Kingdom. |
| 1104665 | 2/1968 | United Kingdom. |

OTHER PUBLICATIONS

WPIL, File Supplier, AN=86-221342, Derwent Publications Ltd., London, GB; & JP-A-61 151 204, Jul. 9, 1986.

WPIL, File Supplier, AN=88-124332, Derwent Publications Ltd., London, GB & JP-A-63 069 809, Mar. 29, 1988.

Primary Examiner—Ellis P. Robinson
Assistant Examiner—Rena L. Dye
Attorney, Agent, or Firm—Oblon, Spivak, McClelland, Maier & Neustadt

[57] ABSTRACT

A blow molded container made of a polypropylene resin obtained by injection stretch blow molding of a polypropylene resin in which the polypropylene resin is a propylene polymer composition containing from 0.0001 to 10% by weight of 3-methylbutene-1 polymer, as well as medical instruments comprising the blow molded container made of the polypropylene resin.

7 Claims, No Drawings

BLOW MOLDED CONTAINER MADE OF POLYPROPYLENE RESIN

This application is a continuation of application Ser. No. 07/613,697, filed on Dec. 13, 1990, now abandoned.

TECHNICAL FIELD

The present invention concerns an injection stretch blow molded container made of a polypropylene resin having excellent transparency and strength and with less odors.

BACKGROUND ART

Since polypropylene series resins are excellent, for example, in heat resistance, chemical resistance and steam barrier property, as well as blow molded products (hollow molded containers) thereof are also excellent in the rigidity and impact shock resistance, they are generally used for tableware containers, detergent containers, medical containers for fluid supplementation. However, the blow molded containers made of polypropylene having such excellent properties have a problem in that the transparency is insufficient. In particular, high transparency is required in the medical containers for fluid supplementation so that obstacles in the liquid contents can be observed.

Heretofore, as a method of improving the transparency of polypropylene molded products, there has been proposed, for example, to apply heat molding with addition of a nucleating agent such as dibenzilidene sorbitol or di(alkylbenzilidene)sorbitol (refer to Japanese Unexamined Patent Publication Nos. 22740/1976, 117044/1978, 30449/1981 and 225143/1983).

However, when the polypropylene resin is molded under heating being blended with dibenzilidene sorbitol or di(alkylbenzilidene)sorbitol, odors are caused during heat molding and the resultant molding products have odors. In a case of using them as containers for fluid supplementation, there is also a safety and sanitary problem such as leaching of the nucleating agent to the fluid supplementation.

For overcoming such a problem, there has been proposed a method of adding a high molecular compound such as 3-methylbutene-1 polymer or vinyl cycloalkane polymer as a nucleating agent (refer to Japanese Examined Patent Publication No. 32430/1970 and Japanese Unexamined Patent Publication No.139731/1985) but higher transparency has been demanded.

DISCLOSURE OF THE INVENTION

The present invention concerns a blow molded container made of polypropylene resin obtained by injection stretch molding of a polypropylene resin stretching, in which the polypropylene resin comprises a polypropylene polymer composition containing from 0.0001 to 10% by weight of a 3-methylbutene-1 polymer, as well as medical instruments comprising such a blow molding container.

As the degree of crystallinity of the 3-methylbutene-1 polymer used in the present invention is higher, it can provide greater effect for improving optical properties. As one of the measures for indicating the degree of the crystallinity, melting point or heat of fusion measured by a differential scanning calorimeter is used.

The 3-methylbutene-1 polymer used in the present invention has a melting point preferably higher than 300° C. and a heat of fusion preferably at least 9 cal/g. Those with the melting point lower then 300° C. or with a heat of fusion of less than 9 cal/g are not preferred since the effect for improving the optical property is insufficient. The 3-methylbutene-1 polymer has, more preferably, a melting point of higher than 303° C. and a heat of fusion of at least 15 cal/g and, most preferably, a melting point of at least 305° C. and a heat of fusion of at least 16 cal/g.

Within the range for satisfying the above-mentioned conditions, the 3-methylbutene-1 polymer used in the present invention may be a copolymer with other α-olefin having 2 to 18 carbon atoms, but it is, preferably, a homopolymer.

As a catalyst system used for obtaining the 3-methylbutene-1 polymer described above, a Ziegler-Natta catalyst capable of providing a polymer, particularly having a high stereo regularity, is used.

Such a catalyst is described in, for example, Japanese Examined Patent Publication Nos. 27871/1979, 8451/1980, 8452/1980, 8003/1980, 39165/1980 and 14054/1980.

For instance, there has been used suitably a catalyst system with an aluminum content of not more than 0.15 as expressed by the ratio of atoms of aluminum to titanium and comprising a solid titanium trichloride catalyst complex containing a complexing agent, an organic aluminum compound or, further, an electron donating compound as the third ingredient such as ether, ester, amine or amide.

As an example for the solid titanium trichloride catalyst complex, there can be mentioned a solid titanium trichloride compound obtained by reducing $TiCl_4$ with an organic aluminum compound represented by the general formula $AlR_nX_{3-n}$ (where R represents a hydrocarbon group of 1 to 20 carbon atoms, preferably, an alkyl group with 1 to 20 carbon atoms and, more preferably, an alkyl group with 2 to 6 carbon atoms, X is a halogen atom and n is 1 to 3), then applying a treatment with a complexing agent having an electron donating atom or group such as ether, thioether, amine, amide, ketone, ester or phosphine and, depending on the case, further with $CCl_4$ or $TiCl_4$; or a solid titanium trichloride compound deposited from a homogeneous liquid hydrocarbon solution comprising $TiCl_3$ and a complexing agent having an electron donating atom or group such as ether and, optionally $TiCl_4$, by means of heating or by treatment with $TiCl_4$; or a solid titanium trichloride compound deposited by reducing $TiCl_4$ with an organic aluminum compound represented by the general formula $AlR_nX_{3-n}$ (where R, X and n are the same as described above) under the presence of a complexing agent having an electron donating atom or group such as ether. The comlexing agent described above is selected from the group consisting of ethers, thioethers, amines, amides, ketones, esters and phosphines. There are used, preferably, ethers and, more preferably, dialkyl ethers with 3 to 10 carbon atoms.

As an example for the dialkyl ether, there can be mentioned, for example, di-n-butyl ether, di-n-amyl ether, dioctyl ether, didecyl ether, amyl butyl ether, ethyl hexyl ether or hexyl octyl ether.

In addition for increasing the degree of crystallinity higher for the 3-methylbutene-1 polymer used in the present invention, it is preferred to polymerize 3-methylbutene-1 by an amount greater than 10 g per one gram of a solid titanium trichloride catalyst complex under the presence of a catalyst in which an aluminum content to titanium is not greater than 0.15 as expressed by the ratio of atoms of aluminum to titanium and comprising a solid titanium trichloride catalyst complex containing a complexing agent, an organic aluminum compound and, further, an electron donating compound.

The amount of the 3-methylbutene-1 polymer in the propylene polymer is from 0.0001 to 10% by weight, preferably, from 0.0003 to 3% by weight. If the content of the 3-methylbutene-1 polymer is too low, the effect for improving the transparency is insufficient. On the other hand, if the content of the 3-methylbutene-1 polymer is too high, it is not so preferred since there are such problems as occurrence of fish eyes, reduction of the transparency due to the 3-methylbutene-1 polymer per se and increase of the cost.

As the process for producing a propylene polymer composition containing a 3-methylbutene-1 polymer used in the present invention, there can be mentioned a process for polymerizing 3-methylbutene-1 by using a Ziegler-Natta catalyst and then conducting homopolymerization of propylene or copolymerization of propylene with other α-olefin of 2 to 18 carbon atoms under the presence of the resultant 3-methylbutene-1 polymer or a process of preparing a polymer as a master batch in the above-mentioned process and then mixing it with a homopolymer of propylene or a copolymer of propylene and other α-olefin.

For the polymerization of propylene or propylene and other α-olefin with 2 to 18 carbon atoms in the succeeding step of the former process, polymerization is attained for at least 500 g, preferably, at least 1,000 g and, more preferably, at least 2,000 g based on one gram of the solid catalyst ingredient, although being related with the amount of polymerization for 3-methylbutene-1.

If the polymerization amount of propylene based on the solid catalyst ingredient is lower than the above-specified range, the nuclei-forming ability per 3-methylbutene-1 polymer is reduced.

In the latter process, there is no particular limit for the content of the 3-methylbutene-1 polymer in the propylene polymer composition containing the 3-methylbutene-1 polymer prepared by the former process, but it is preferably less than 10% by weight and, more preferably, less than 5% by weight. The mixing method may be a usual method, for example, by an extruder, a Brabender kneader or a roll.

Upon mixing, it is desirable to conduct kneading within such a temperature range as not melting the 3-methylbutene-1 polymer. As the starting propylene polymer used in admixture with the 3-methylbutene-1 polymer, there can be mentioned a propylene homopolymer or a random or block copolymer of propylene and other α-olefin (ethylene or other α-olefin with upto 12 carbon atoms) (the copolymerizing ratio of ethylene or other α-olefin is upto 15% by weight and, preferably, from 0.1 to 5.0% by weight).

There is no particular limit for the melt flow rate (hereinafter simply referred to as MFR) of the polypropylene resin, those within a range usually from 0.2 to 50 g/10 minutes, desirably, 0.4 to 30 g/10 minutes as expressed by a value measured in accordance with the method of JIS K-7210, at 230° C. and under a load of 2.16 kg are preferably used.

Further, it is also possible to properly blend and use various kinds of additives generally blended with polypropylene resins, for example, anti-oxidant, lubricant, antistatic agent, anti-blocking agent, and known polymers, fillers, such as rubber, silica, or the like.

In the present invention, an injection blow molded container (hollow molded container) is manufactured by using the propylene polymer containing the 3-methylbutene-1 polymer and subjecting the same to the injection stretch blow molding (stretch blow molding).

That is, a hollow container is manufactured by molding a bottomed parison by injecting a molten resin of the propylene polymer into a die at a temperature of 190° to 290° C., applying preliminary blowing if desired, and then applying stretch blow molding under the conditions of a resin temperature at 90° to 150° C., and at a stretching ratio of 1.2 to 3.5 times (preferably, 1.2 to 2.2 times) in the longitudinal direction and 1.2 to 6.0 times (preferably, 1.5 to 5.0 times) in the lateral direction. The wall thickness of the bottomed parison ranges from 1.5 to 6 mm. The bottomed parison may be cooled to solidify (cold parison) and then applied with stretch blow molding by reheating to the resin temperature as described above or the shape of the parison can be retained without cooling to solidify the bottomed parison. Further, it may be taken out of a die while at least a portion of the parison is still in a molten state (hot parison) and then applied with stretch blow molding at the resin temperature described above. The stretch blowing process is conducted by a method of combining mechanical longitudinal stretching by a stretching rod and a blow stretching by air blowing (lateral stretching).

BEST MODE FOR CARRYING OUT THE INVENTION

Examples will be shown below but the present invention is not restricted to the following Examples unless it does not go beyond the gist thereof. Values for the physical property in the subsequent examples were measured in accordance with the following methods.

(1) Melt Flow Rate (MFR)

Measured in accordance with JIS K-7210 (230° C., under a load of 2.16 kg)

(2) Crystallizing Temperature (Tc)

Measured at a temperature elevating and falling rate at 10° C./min using a DSC2C type differential scanning calorimeter manufactured by Perkin-Elmer Co.

(3) Parallel Light Transmittance

Parallel light transmittance (%) was determined by using Clarity Meter TM-1D Model manufactured by Murakami Shikisai Institute, setting the total light transmittance as 100, projecting a spot at the center for each of the portions of a bottle container, rotating the bottle container by one turn, taking out only the direct light (parallel light) and reading the maximum amount of light thereof.

(4) Heat Resistance

The container body was punched into a rectangular piece (15 mm × 50 mm) and annealed in air at 120° C.-1 hr. Subsequently, after leaving it in a thermostat chamber at 23° C. and 65% for 24 hrs, shrinkage along the direction of height *1 and along the circumferential direction *2 were measured.

*1) Shrinkage in the longitudinal direction of a rectangular piece 50 mm in height × 15 mm in circumferential direction.

*2) Shrinkage in the longitudinal direction of a rectangular piece 15 mm in height × 50 mm in circumferential direction.

(5) Strength

Tensile impact strength along the direction of the height of the container was measured by punching the container body in accordance with ASTM D 1822-63.

(6) Odor Evaluation Method

① Evaluation Method

Specimens each cut into about 5 mm square were charged by 10 g in a 250 cc Erlenmyer flask and tightly capped. Evaluation for odors was conducted by leaving them under the condition at a temperature of 40° C. for 48 hours.

② Judging Method for Odor

Evaluation was made for 1-5 five steps. 1: scarcely smelling, 2: slightly smelling, 3: smelling, 4: strongly smelling, 5: very strongly smelling.

Evaluation was made by five persons and the average value was calculated by counting fractions of 0.3 and over and cutting away the rest.

(7) Leaching Test

Leaching test was conducted according to a test method for plastic container for use in fluid supplementation as specified in the general test method of Japanese Pharmacopoeia, and it was judged as satisfactory or failure.

EXAMPLE 1

(a) Catalyst Preparation Example

At room temperature, 515 ml of purified toluene was charged into a one liter volume autoclave sufficiently substituted with nitrogen and 65.1 g (0.5 mol) of n-butyl ether, 94.9 g (0.5 mol) of titanium tetrachloride and 28.6 g (0.24 mol) diethyl aluminum- chloride were added, under stirring, to obtain a homogenous brown solution. Then, the temperature was elevated to 30° C. After elapse of 30 min, the temperature was elevated to 40° C. and kept at 40° C. as it was for 2 hours. Subsequently, 32 g (0.17 mol) of titanium tetrachloride and 15.5 g (0.058 mol) of tridecylmethacrylate were added and the temperature was elevated to 98° C. After maintaining at 98° C. for 2 hours, granular purple solids were separated and washed with toluene to obtain solid titanium trichloride.

(b) Resin Production Example-1

(Production of propylene polymer master batch containing 3-methylbutene-1 polymer)

At room temperature, 1.2 mmol of diethyl aluminum chloride was added under argon sealing into a 2 liter magnetic induction stirring type autoclave sufficiently substituted with purified argon and, further, 700 cc of liquid 3-methylbutene-1 was charged.

Then, the temperature was elevated to 70° C. and 3-methylbutene-1 was polymerized for one hour with addition of 91 mg of the solid catalyst ingredient obtained in the catalyst preparation example. Subsequently, after purging all of the amount of 3-methylbutene-1, 3 mmol of diethyl aluminum chloride and 0.12 mmol of methylmethacrylate were supplemented additionally. An $H_2$ pressure was set to 0.5 kg/cm² and 700 g of propylene was further added to conduct homopolymerization of propylene. After 30 minutes, propylene was- purged and the catalyst was removed with a mixed solvent of isobutanol-n-hexane to obtain 271 g of a propylene polymer composition including the 3-methylbutene-1 polymer.

The amount of a 3-methylbutene-1 polymer obtained in an experiment conducted under identical polymerization conditions but with no propylene polymerization was 10.8 g.

The 3-methylbutene-1 polymer had a melting point of 311° C. and a heat of fusion of 20 cal/g.

The content of the 3-methylbutene-1 polymer in the propylene polymer composition calculated based on the yield of the 3-methylbutene-1 polymer was 4.0% by weight.

This propylene polymer composition had MFR of 0.27 g/10 minutes, a melting point of 163.4° C. and a crystallizing temperature of 126.6° C.

(c) Resin Production Example-2

1.27 parts by weight of the propylene polymer composition obtained in Resin Production Example-1, 0.1 part by weight of calcium stearate as a stabilizer, 0.2 part by weight of BHT (2,6-di-t-butylhydroxy toluene) and 0.08 part by weight of Illuganox 1010 {tetrakis[-methylene-3-(3',5'-di-t-butyl-4-hydroxyphenyl)propionate]methane, antioxidant manufactured by Ciba Geigy Co.} were added to 100 parts by weight of a propylene-ethylene random copolymer (trade name: Mitsubishi Polypro 6200El, manufactured by Mitsubishi Kasei Co., melt flow rate: 3.2 g/10 min, density: 0.894 g/cm², melting point: 135° C., crystallizing temperature: 95° C.) and, after mixing in a Henschel mixer, they were pelletized by a 50 mmφ extruder into pellets. The content of the 3-methylbutene-1 polymer in the resin composition was 0.05% by weight.

(b) Production of Injection Stretch Blow Molding (biaxial stretch blow molding) Container Pellets obtained in Resin Production Example-2 were injected by using a biaxial stretch blow molding machine (Model SB-150 III, manufactured by Aoki Institute) into a die at a surface temperature of 20° C. under the conditions of a resin temperature of 240° C. and an injection pressure of 60 kg/cm² and then taken out from the die. The bottomed parison had a stretched diameter portion of 24.0 mmφ, a stretched body length of 50 mm and a body wall thickness of 4.0 mm. The molded conditions were 7.0 sec of injection time and 2.5 sec of cooling time and the product was taken out from the die. The temperature of the body portion of the bottomed parison was 111° C.

For the temperature of the body portion of the bottomed parison, the temperature at the surface of the parison body was measured by using a digital radiation thermometer (Model IR-AH, manufactured by Chino Co.).

The resultant bottomed parison at a high temperature was put into a blow mold and it was stretched in the longitudinal direction by introducing a stretching rod to the inside of the bottomed parison and pressing the bottom of the bottomed parison and a pressurized air of 10 kg/cm² was blown for five seconds around the end of the longitudinal stretching to obtain a blown biaxially stretched bottle. The temperature of the blow mold in this case was 15° C. and the bottle was cooled after the completion of the blowing and taken out from the blow mold. The resultant bottle had about 80 mm height and about 60 mmφ diameter at the stretched body portion.

The thickness was about 0.3 mmt also as the thickness for the body portion.

For the resultant bottle, transparency (parallel light transmittance), heat resistance, leaching test and odor were evaluated. The results are shown in Table 1.

EXAMPLES 2-6

The procedures were the same as in Example 1 except for changing the blending amount of the 3-methylbutene-1 polymer and the conditions for injection stretch blow molding into those conditions shown in Table 1. The results are shown in Table 1.

EXAMPLES 7-8

At room temperature, 800 ml of purified n-hexane and then 13.0 mmol of diethyl aluminum chloride and 4,000 mg of the solid catalyst ingredient obtained in Catalyst Preparation Example 1 were added under argon sealing to a 2 liter magnetic induction stirring type autoclave sufficiently substituted with purified argon and the temperature was elevated to 70° C. Then, 206 ml of 3-methylbutene-1 was charged to conduct polymerization of 3-methylbutene-1 at 70° C. for 30 minutes.

Subsequently, unreacted 3-methylbutene-1 was purged and washing was conducted with purified n-hexane.

The amount of 3-methylbutene-1 formed was 11.0 g based on one gram of the solid catalyst ingredient.

The 3-methylbutene-1 polymer had a melting point of 308° C. and a heat of fusion of 16 cal/g.

Then, at room temperature 52 mmols of diethyl aluminum chloride, 1.7 mmols of methylmethacrylate and 9 liters of purified n-hexane were added, under argon sealing, to a 24 liter magnetic induction stirring type autoclave sufficiently substituted with purified argon and an $H_2$ pressure was set to 0.3 kg/cm². Then the temperature was elevated to 70° C. and 1,330 mg of the catalyst ingredient obtained as described above was introduced as a Ti catalyst ingredient, and propylene was added in such an amount as to control the propylene pressure at 6 kg/cm³ and hompolymerization of propylene was conducted. After 4.5 hours, propylene was purged and the catalyst was removed by a mixed catalyst of isobutanol-n-hexane to obtain 4,890 g of a propylene polymer composition including the 3-methylbutene-1 polymer.

The content of the 3-methylbutene-1 polymer in the propylene polymer composition was 0.299% by weight.

Subsequently, a resin composition of propylene-ethylene random copolymer was obtained in the same procedures as those in Resin Production Example-2 except for using one part by weight of the polymer (Example 7) or 0.16 part by weight of the polymer (Example 8) in Resin Production Example-2 instead of 1.27 parts by weight of the polymer obtained in the Resin Production Example-1.

Injection stretch blow molding was conducted by using the resin thus obtained and molding was conducted in the same molding conditions as those in Example 2.

The results are shown in Table 1.

TABLE 1

|  |  | Example 1 | Example 2 | Example 3 | Example 4 | Example 5 | Example 6 | Example 7 | Example 8 |
|---|---|---|---|---|---|---|---|---|---|
| Kind of nucleating agent | | 3-methyl-butene-1 polymer | 3-methyl-butene-1 polymer | 3-methyl-butene-1 polymer | 3-methyl-butene-1 polymer | 3-methyl-butene-1 polymer | 3-methyl-butene-1 polymer | 3-methyl-butene-1 polymer | 3-methyl-butene-1 polymer |
| Content of nucleating agent (wt %) | | 0.05 | 0.05 | 0.05 | 0.10 | 0.10 | 0.10 | 0.003 | 0.0005 |
| Molding condition | Injection molding temperature (°C.) | 240 | 240 | 240 | 240 | 240 | 240 | 240 | 240 |
| | Parison temperature (°C.) | 111 | 109 | 103 | 111 | 109 | 103 | 109 | 109 |
| | Longitudinal stretching ratio (times) | 1.5 | 1.5 | 1.5 | 1.5 | 1.5 | 1.5 | 1.5 | 1.5 |
| | Lateral stretching ratio (times) | 2.5 | 2.5 | 2.5 | 2.5 | 2.5 | 2.5 | 2.5 | 2.5 |
| | Wall thickness of bottle (μm) | 300 | 300 | 300 | 300 | 300 | 300 | 300 | 300 |
| Transparency (parallel light transmittance) (%) | | 26 | 19 | 16 | 26 | 22 | 16 | 21 | 18 |
| Odor (score) | | 2 | 1 | 1 | 2 | 1 | 1 | 1 | 1 |
| Heat resistance [shrinkage in the direction of height/circumference (%)] | | 2.5/2.6 | 3.0/2.6 | 6.8/4.4 | 2.8/2.5 | 2.8/2.5 | 5.2/4.0 | 3.1/2.7 | 3.3/3.0 |
| Leaching test | | pass | pass | pass | pass | pass | pass | pass | pass |
| Strength [Tensile impact strength (kg · cm/cm²)] | | 400 | 450 | 600 | 420 | 520 | 630 | 450 | 450 |

COMPARATIVE EXAMPLES 1-3

The procedures were the same as those in EXAMPLE 1 except for carrying out them under the injection stretch blow molding conditions shown in Table 2 without blending the 3-methylbutene-1 polymer at all.

The results are shown in Table 2.

COMPARATIVE EXAMPLES 4-6

The procedures were the same as those in EXAMPLE 1 except carrying out them while replacing the 3-methylbutene-1 polymer with a commercially available nucleating agent: dibenzilidene sorbitol (Denon YK-1, trade name of product manufactured by Marubishi Yuka Co.) and under injection stretch blow molding conditions as shown in Table 2. The results are shown in Table 2.

TABLE 2

|  |  | Comparative Example 1 | Comparative Example 2 | Comparative Example 3 | Comparative Example 4 | Comparative Example 5 | Comparative Example 6 |
| --- | --- | --- | --- | --- | --- | --- | --- |
| Kind of nucleating agent |  | — | — | — | Dibenzilidene sorbitol | Dibenzilidene sorbitol | Dibenzilidene sorbitol |
| Content of nucleating agent (wt %) |  | — | — | — | 0.3 | 0.3 | 0.3 |
| Molding condition | Injection molding temperature (°C.) | 240 | 240 | 240 | 240 | 240 | 240 |
|  | Parison temperature (°C.) | 111 | 109 | 103 | 111 | 109 | 103 |
|  | Longitudinal stretching ratio (times) | 1.5 | 1.5 | 1.5 | 1.5 | 1.5 | 1.5 |
|  | Lateral stretching ratio (times) | 2.5 | 2.5 | 2.5 | 2.5 | 2.5 | 2.5 |
|  | Wall thickness of bottle (μm) | 300 | 300 | 300 | 300 | 300 | 300 |
| Transparency (parallel light transmittance) (%) |  | 18 | 16 | 12 | 26 | 19 | 16 |
| Odor (score) |  | 1 | 1 | 1 | 5 | 5 | 4 |
| Heat resistance [shrinkage in the direction of height/circumference (%)] |  | 6.3/4.4 | 7.0/5.0 | 10.5/10.5 | 2.8/2.2 | 2.8/2.2 | 4.8/3.8 |
| Leaching test |  | pass | pass | pass | failed | failed | failed |
| Strength [Tensile impact strength (kg · cm/cm$^2$)] |  | 300 | 380 | 560 | 520 | 530 | 640 |

COMPARATIVE EXAMPLES 7-9

(a) Production of Resin Composition

A polypropylene resin composition containing a 3-methylbutene-1 polymer was obtained in the same manner as in example 7 except for changing the blending amount of the 3-methylbutene-1 polymer to the conditions in Table 3.

(b) Production of Extrusion Blow Molded (direct blow molded) Container

The pellets obtained by the above-mentioned method were formed into a parison by using a blow molding machine (Model BA-2, manufactured by Sumitomo Juki) in an extruding amount of 8 kg/H and a resin temperature of 220° C. Then, after the parison was clamped in a die at 25° C., air was brown and then the product was taken out from the die. The parison had an inner diameter of 36 mmφ, an outer diameter of 40 mmφ and a wall thickness at the body portion of about 2 mmt.

The parison obtained was charged into a blow mold and then stretched laterallly by blowing a pressurized air at 6 kg/cm$^2$ for 20 seconds as molding conditions to obtain a bottle.

The resultant bottle had an inner height of 140 mm, a diameter of 80 mmφ and the wall thickness at the body portion of about 0.6 mmt.

For the resultant bottle, transparency (parallel light transmittance), odor and strength were evaluated. The results are shown in Table 3.

COMPARATIVE EXAMPLES 10-13

An extrusion blow molding container was obtained in the same procedures as those in Comparative Example 7 except for replacing the nucleating agent with those shown in Table 3. The results are shown in Table 3.

TABLE 3

|  |  | Comparative Example 7 | Comparative Example 8 | Comparative Example 9 | Comparative Example 10 | Comparative Example 11 | Comparative Example 12 | Comparative Example 13 |
| --- | --- | --- | --- | --- | --- | --- | --- | --- |
| Kind of nucleating agent |  | 3-methylbutene-1 polymer | 3-methylbutene-1 polymer | 3-methylbutene-1 polymer | not added | Dibenzilidene sorbitol | Dibenzilidene sorbitol | Dibenzilidene sorbitol |
| Content of nucleating agent (wt %) |  | 0.05 | 0.1 | 0.3 | 0 | 0.1 | 0.2 | 0.3 |
| Molding condition | Extrusion Blow Molding temperature (°C.) | 220 | 220 | 220 | 220 | 220 | 220 | 220 |
|  | Parison temperature (°C.) | 220 | 220 | 220 | 220 | 220 | 220 | 220 |
|  | Lateral stretching ratio (times) | 2 | 2 | 2 | 2 | 2 | 2 | 2 |
|  | Wall thickness of bottle (μm) | 600 | 600 | 600 | 600 | 600 | 600 | 600 |
| Transparency (parallel light transmittance) (%) |  | 8 | 9 | 8 | 6 | 10 | 16 | 20 |
| Odor (score) |  | 2 | 2 | 2 | 2 | 5 | 5 | 5 |
| Strength [Tensile impact strength (kg · cm/cm$^2$)] |  | 300 | 300 | 300 | 300 | 300 | 320 | 330 |

Industrial Applicability

The blow molded container made of a polypropylene resin according to the present invention is improved with the transparency, mechanical strength, odor and safe and sanitary property, and it can be used suitably, for example, to medical containers for fluid supplementation or tableware containers.

We claim:

1. A blow molded container made of a polypropylene resin obtained by injection stretch blow molding of a polypropylene resin, characterized in that the polypropylene resin contains from 0.0003 to less than 0.1% to by weight of a 3-methylbutene-1 polymer, the 3-methylbutene-1 polymer having a melting point of at least 300° C. and a heat of fusion of at least 9 cal/g.

2. The blow molded container made of a polypropylene resin according to claim 1, wherein the 3-methylbutene-1 polymer has a melting point of at least 303° C. and a heat of fusion of at least 15 cal/g.

3. The blow molded container made of a polypropylene resin according to claim 1, wherein the 3-methylbutene-1 polymer has a melting point of at least 305° C. and a heat of fusion of at least 16 cal/g.

4. The blow molded container made of a polypropylene resin according to claim 1, wherein the polypropylene resin is a propylene polymer composition obtained by:

preliminarily polymerizing 3-methylbutene-1, under the presence of a catalyst with an aluminum content of not more than 0.15 as expressed by the ratio of atoms of aluminum to titanium and comprising a solid titanium trichloride catalyst complex containing a complexing agent and an organic aluminum compound, and an electron donating compound, in an amount of greater than 10 g based on 1 g of said solid titanium trichloride catalyst complex, and then polymerizing propylene or propylene and other α-olefin of 2 to 18 carbon atoms by at least 500 g based on 1 g of said solid titanium trichloride catalyst complex.

5. The blow molded container made of a polypropylene resin according to claim 1, wherein the polypropylene resin is a mixture of (i) a propylene polymer composition and (ii) a propylene homopolymer or a copolymer of propylene with α-olefin of 2 to 18 carbon atoms, said propylene polymer composition (i) being obtained by:

preliminarily polymerizing 3-methylbutene-1, under the presence of a catalyst with an aluminum content of not more than 0.15 as expressed as by the ratio of atoms of aluminum to titanium and comprising a solid titanium trichloride catalyst complex containing a complexing agent and an organic aluminum compound, and an electron donating compound, in an amount of greater than 10 g based on 1 g of said solid titanium trichloride catalyst complex, and then polymerizing propylene or propylene and other α-olefin of 2 to 18 carbon atoms in an amount by at least 500 g based on 1 g of said solid titanium trichloride catalyst complex.

6. The blow molded container made of a polypropylene resin according to claim 1, wherein the injection stretch blow molding is a molding method, which comprises injecting a molten resin of a propylene polymer composition containing from 0.0003 to less than 0.1% by weight of a 3-methylbutene-1 polymer at a temperature of 190° to 290° C. into a mold thereby forming a bottomed parison, and then applying, with or without preliminary blowing, stretch blow molding under the conditions at a resin temperature of 90° to 150° C. and a stretching ratio of 1.2 to 3.5 times in the longitudinal direction and 1.2 to 6.0 times in the lateral direction.

7. The blow molded container made of a polypropylene resin according to claim 1, which is in the form of a medical container suitable for fluid supplementation.

* * * * *

UNITED STATES PATENT AND TRADEMARK OFFICE
CERTIFICATE OF CORRECTION

PATENT NO. : 5,286,540
DATED : February 15, 1994
INVENTOR(S) : Yoshinori SUGA, et al.

It is certified that error appears in the above-indentified patent and that said Letters Patent is hereby corrected as shown below:

On the title page, Item [63], the Related U.S. Application Data should read as follows:

--Continuation of Ser. No. 613,697, Dec. 13, 1990, filed as PCT/JP90/00411, Mar. 28, 1990, abandoned.--

Signed and Sealed this

Nineteenth Day of July, 1994

Attest:

BRUCE LEHMAN

*Attesting Officer*  *Commissioner of Patents and Trademarks*